(No Model.) 2 Sheets—Sheet 1.
F. A. SAWYER, 2d.
CARRIAGE STEP.
No. 247,116. Patented Sept. 13, 1881.
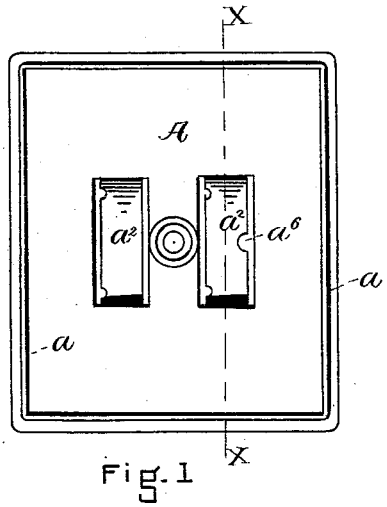
Fig. 1
Fig. 2
Fig. 3.
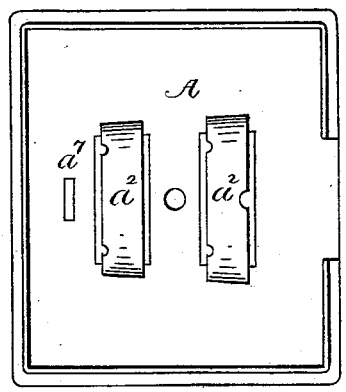
Fig. 4
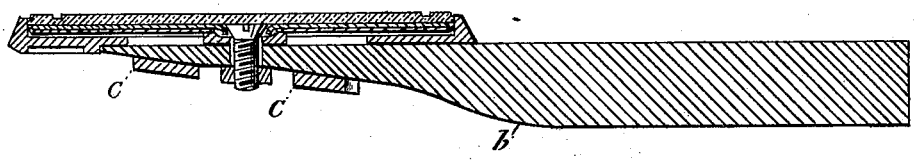
Fig. 5.
WITNESSES
O. A. Raymond 2d
A. J. Oettinger
INVENTOR
Francis A. Sawyer 2d
N. PETERS. Photo-Lithographer, Washington, D. C.

(No Model.)

F. A. SAWYER, 2d.

2 Sheets—Sheet 2.

CARRIAGE STEP.

No. 247,116.

Patented Sept. 13, 1881.

WITNESSES
O. G. Raymond
A. J. Oettinger.

INVENTOR
Francis A. Sawyer 2d

UNITED STATES PATENT OFFICE.

FRANCIS A. SAWYER, 2D, OF BOSTON, MASSACHUSETTS.

CARRIAGE-STEP.

SPECIFICATION forming part of Letters Patent No. 247,116, dated September 13, 1881.

Application filed January 19, 1881. (No model.)

*To all whom it may concern:*

Be it known that I, FRANCIS A. SAWYER, 2d, of Boston, in the county of Suffolk and Commonwealth of Massachusetts, have invented a certain new and useful Improvement in Carriage-Steps, of which the following is a full, clear, and exact description, reference being had to the accompanying drawings, forming a part of this specification, in explaining its nature, and in which—

Figure 6:
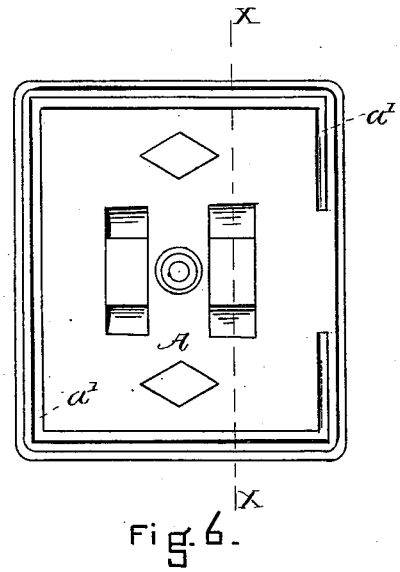
Figure 7:
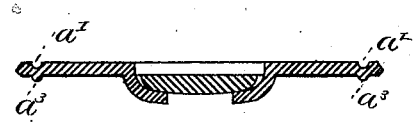
Figure 8:
Figure 7:
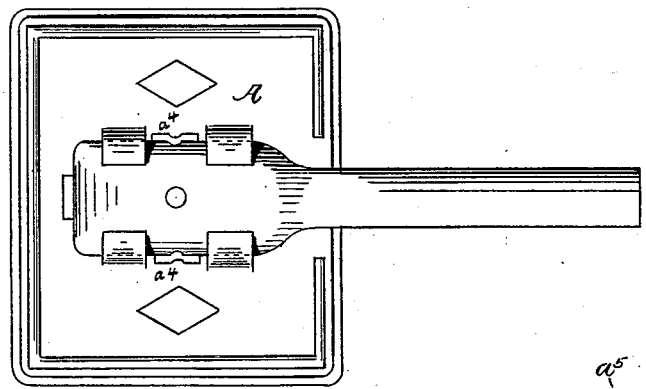
Figure 10:
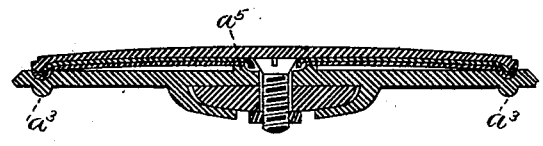

Figure 1 is a plan of a carriage-step, plate, or pad; Fig. 2, a cross-section on the line X X of Fig. 1; Fig. 3, a cross-section on the same line, representing additionally a cross-section of the shank for supporting it and attaching it to the bracket or arm depending from the carriage. Fig. 4 is a plan of the step, plate, or pad inverted and of the shank inverted. Fig. 5 is a vertical section representing the step, plate, or pad, the shank, and an independent tread. Fig. 6 is a plan of a step, plate, or pad representing a modification of the construction shown in Figs. 1 and 2. Fig. 7 is a cross-section on the line X X of Fig. 6, showing also a cross-section of the shank. Fig. 8 is a cross-section illustrating a slight variation in the shape of the outer edge of the step, plate, or pad. Fig. 9 is a plan of the step, plate, or pad shown in Fig. 6 and of the shank inverted. Fig. 10 is a cross-section of the plate, step, or pad shown in Figs. 6 and 7 and of an independent or separable tread and shank.

This invention is an improvement upon that class of inventions described in my Letters Patent of the United States No. 182,963, dated October 3, 1876, No. 203,076, dated April 30, 1878, No. 220,666, dated October 14, 1879, and No. 220,667, dated October 14, 1879. In the first-named Letters Patent I described a step, plate, or pad provided with under-cut converging ribs adapted to fit the end of a shank, which is wedge-shaped in plan and cross-section, and upon which it is driven until a firm bearing is obtained, and then locked by prick-punching or upsetting portions of the ribs upon the recesses or grooves formed in the shank; and in the second of said Letters Patent I describe a modification in the construction, which consists in the employment of a locking-key for fastening the step to the shank after it has been driven thereon, instead of prick-punching or upsetting the ribs. This method of fastening, however, cannot be used as economically as that hereinafter described, as it requires a very nice preparation of the ribs and shank by planing and gaging to obtain the accurate fit of the parts, which is requisite, and as it necessitates that each part shall be so fitted before the steps and shanks are sent from the factory. By the construction herein described this manipulation is entirely dispensed with, and it becomes possible to sell a step without the shank, as the shank, owing to the provision given the step for easy fastening thereto, can be readily shaped by the blacksmith to the form required, and the step can be driven thereon and fastened without any planing or milling of those parts. Instead, therefore, of providing the step, plate, or pad with the wedging-ribs of said patents, I provide it with one or more wedging bands or straps, which extend downwardly from the under surface of the step, plate, or pad, and are of a shape to receive and lap upon or embrace the end of the shank.

A represents the carriage step, plate, or pad. It is made preferably of homogeneous metal, and when adapted for holding and supporting an independent tread of rubber or other material is provided either with a wall, $a$, upon its edge or with the groove $a'$, or with both a wall and groove, as shown in cross-section in Fig. 8. Although one band or strap may be used, I prefer to employ two, and the drawings represent two. These bands or straps $a^2$ are formed either by being cast upon the under surface of the step, plate, or pad or by being struck down from the step, plate, or pad by suitable dies, or in any other suitable or desirable way, and in lieu of being continuous, as shown in Figs. 2 and 3, I represent in Figs. 6, 7, 8, and 9 sectional straps or bands, not extending across the shank from one edge to the other, but arranged simply to lap upon a portion of its under surface. This form of strap or band is preferable when it is made by striking down a portion of the surface of the plate, step, or pad by suitable press and dies. The bands or straps must be provided with a shape or conformation upon that portion of their surface that comes in contact with the shank when driven thereon that shall approximate the shape or configuration of that section of the shank, and they are adapted to yield or stretch somewhat to accommodate themselves to the shape of the shank and to the strain while being forced upon the shank, and they may be provided with recesses $a^6$ upon their edges to allow a somewhat greater yield.

The form of strap that I prefer is shown in Figs. 1, 4, and 5. The shank B preferably is made flat and wide on its upper surface, and is reduced in thickness from the point $b$ on its lower surface to its end, making it wedge-shaped in vertical section. The shank should not be so wide as to completely fill the space between one side of the straps and the other and should be a trifle thicker than the thickness of the space between the upper surface of the straps or that nearest the under surface of the plate (represented in Fig. 5) at the point $c$, and the under surface of the plate, in order that when the shank is driven home through or onto the straps or when the step, plate, or pad is driven upon the shank the strain upon the straps may come at or near their lower corners instead of at their juncture with the bottom of the step, plate, or pad.

The under surface of the shank may be thinned regularly or upon one line to its end, or it may be thinned or reduced gradually on its under surface for a distance sufficient to embrace the section covered by the first strap or band, may then be made parallel, or substantially parallel, with the upper surface or portion for the section immediately about the bolt hole, and may again be thinned from the last-named part to its end for the purpose of fitting the remaining strap or band. I prefer the last-named construction, as with it and a proper shaping of the straps a stronger and more secure union is effected and less care is needed in shaping the straps and shank.

In some instances the shank may be made wide and flat on its upper surface, and its under surface may be so shaped that the straps or bands, particularly when made as shown in Figs. 7 and 8, may be forced or bent upon the said under surface, in which event there would be no wedging action between the shank and straps, but simply a binding action. When this modification is practiced, however, it is essential that the end of the shank be made flat and broad. To shape the end of the shank to either of these forms it is only necessary to provide a die of the requisite shape in a metal block, to heat the end of the shank, and with a hammer to cause it to conform to the shape of the die, and without further manipulation the step or pad can be driven thereon, the straps or bands yielding sufficiently to conform to the surface of the shank until a good bite is obtained. A short shank may be used, in which case it must be welded to the carriage arm or bracket, in the usual way, or the carriage arm or bracket may be shaped at its end in this manner, and I deem this preferable, as it dispenses with the welding necessary when the short shank is used.

The recess $a'$, or the combined recess and wall $a\ a'$, if homogeneous metal is used, may be formed in the step, plate, or pad by a drop-press having dies of suitable shape, and at the same time the bead or projection $a^3$ may be formed on the under surface. This bead or projection, while it allows an exterior groove to be formed in the plate, permits of the use of thinner metal, and serves for lightening the appearance of the step by partly concealing the thickness or bulge on the under surface of the step, plate, or pad, caused by the straps and shank.

When an independent tread is used I prefer to employ one such as is described in my Letters Patent Nos. 202,660 and 202,667—namely, a tread or wearing-surface consisting of a metallic plate having vulcanized thereto a coating or plating of a resilient material, the said tread being provided with a central bolt, by which it is fastened to the step, plate, or pad; but in utilizing such a tread for this purpose the bolt must be somewhat longer than that used for fastening to an ordinary step—such as is described in my said patents—as it must extend through the shank and project sufficiently to receive the fastening-nut, and by so using it the bolt not only answers for fastening the tread to the step, but also in locking the shank to the step.

There may be cast or otherwise formed upon the under surface of the step the two starts or projections $a^4$, which serve as guides for directing or guiding the shank as it is inserted between the straps, and which may be utilized in fastening the step, plate, or pad to the shank by forming V-shaped indentations in the side of the shank, as represented in Fig. 9, and then by upsetting the starts or projections therein.

In case cement is used to seal the joint merely between the under surface of the tread and the upper surface of the step, I provide the step, plate, or pad with a projection, $a^5$, upon its surface about the bolt-hole. This gives a small space between the under surface of the tread and the upper surface of the plate for the reception of the cement. Where a bolt and stiffening-plate are used it is not essential that the surface of the plate, step, or pad be continuous, but it may be lightened by being perforated, as represented in Fig. 6.

I do not intend to confine the use of this invention to carriage-steps only, but may use as much of it as is applicable to car-steps, and also to stationary steps, stairs, &c.

There may be cast or otherwise formed upon the under surface of the plate a stop, $a^7$, against which the end of the shank shall contact when the step has been driven home thereon.

I do not intend to confine myself to the use of the detachable tread shown and described in connection with my other improvements, but may use an independent tread of any suitable material made in any desirable way, and adapted to be fastened to the step, and an independent tread may be made of papier-maché, of leather, of diatite, of any suitable composition having more or less gritty nature, of metal, or of any material adapted for a wearing-surface, and which, either by being provided with a bolt or by means of cement, or in any other way, can be fastened to the supporting portion of the step and be removable when worn.

When the shank is not wedge-shaped in vertical section it will be desirable to incline the upper surface of each strap somewhat more than for a wedge-shaped shank, and to make the shank of such size that the narrow upper part shall bite the shank as firmly as necessary.

When the step, plate, or pad is used without an independent tread its upper surface may have any desired configuration or ornamentation, and when an independent tread is used it is not essential that the step, plate, or pad have either a groove or wall about its edge.

In forming the bolt-hole in the thin plate of the independent tread I prefer to strike down the portion about the edge to form a countersunk hole in the upper surface of the plate for the reception of the bolt or screw head.

I am aware that the Patent No. 146,551, granted Porter, dated January 20, 1874, shows a carriage-step which has formed upon its under surface a number of starts or projections which are adapted to be bent from a vertical position about a divided shank in the act of fastening the step to the branches of the shank; but as these projections are not shaped to approximate the shape of the shank, and as their location and the construction of the shank are such that a wedging action between them is not possible in uniting them, I do not consider that the patent shows the spirit of my invention.

In uniting the step or pad to the shank the end of the shank is inserted within the straps or bands and the step driven firmly thereon, thereby causing the straps or bands to firmly wedge or bind the step to the shank. The bolt-hole is then made in the step and shank. It may be desirable, in some instances, to heat the straps or bands before the shank is inserted, as by so doing they conform more readily to the shape of the shank, and in cooling bind the step firmly to the shank. This is termed "shrinking on," and it is not essential when the step is shrunk onto the shank to use a bolt for locking the step to the shank.

Having thus fully described my invention, I claim and desire to secure by Letters Patent of the United States—

1. A step consisting of a metal plate formed upon its under surface with one or more bands or straps curved before uniting with the shank to approximate a predetermined shape, as described, whereby a wedging or binding action of the straps or bands upon the shank is obtained by the act of driving the step on the shank, all substantially as and for the purposes set forth.

2. In a carriage-step, one or more bands or straps and the stop $a^7$, substantially as shown and described.

3. In a carriage-step, one or more bands or straps, $a^2$, and the guides $a^4$.

4. The combination of a shank provided with a straight, flat, and wide head with a step having one or more straps or bands, shaped as described, and adapted to hold, bind, and lock the step to the shank, as set forth.

5. A step-shank provided with a flat upper surface of substantially uniform width, and wedge-shaped or tapered in longitudinal vertical section, substantially as and for the purposes set forth.

6. The combination of the plate provided with one or more straps, the shank, shaped substantially as described, and a bolt and nut for locking the step to the shank, all substantially as and for the purposes set forth.

7. The combination of the step, plate, or pad provided with one or more straps or bands, the shank, shaped substantially as described, an independent tread, and a bolt and nut for locking said tread, step, and shank together, substantially as and for the purposes described.

8. A carriage-step provided with a projection or bead, $a^3$, on its under surface, and the grooves $a'$ in its upper surface, formed at one operation with the bead, as described.

9. The combination of the step, plate, or pad, provided with one or more bands or straps adapted to lap upon and embrace, or partly embrace, the shank and wedge it thereto, a shank having a straight, flat, wide head, and means for locking the shank and step together independent of the binding or wedging action of the straps or bands, substantially as and for the purposes described.

FRANCIS A. SAWYER, 2D.

Witnesses:
F. F. RAYMOND, 2d,
A. J. OETTINGER.